United States Patent
Sakakibara

Patent Number: 6,075,347
Date of Patent: Jun. 13, 2000

[54] BATTERY CHARGER AND CHARGING METHOD

[75] Inventor: Kazuyuki Sakakibara, Aichi-Ken, Japan

[73] Assignee: Makita Corporation, Aichi-ken, Japan

[21] Appl. No.: 09/258,140

[22] Filed: Feb. 26, 1999

[30] Foreign Application Priority Data

Feb. 28, 1998 [JP] Japan .................................. 10-064736

[51] Int. Cl.⁷ ..................................................... H02J 7/04
[52] U.S. Cl. .......................................... 320/150; 320/153
[58] Field of Search .................................... 320/150–154, 320/160; 429/61; 324/431, 426, 441; 340/636, 640, 643; 20/150

[56] References Cited

U.S. PATENT DOCUMENTS

| | | | |
|---|---|---|---|
| 5,363,031 | 11/1994 | Miller et al. | 320/160 |
| 5,489,836 | 2/1996 | Yuen | 320/150 |
| 5,493,199 | 2/1996 | Koenck et al. | 320/152 |
| 5,497,068 | 3/1996 | Shiojima | 320/150 |
| 5,519,303 | 5/1996 | Goedken et al. | 320/150 |
| 5,550,453 | 8/1996 | Bohne et al. | 320/160 |
| 5,563,496 | 10/1996 | McClure | 320/151 |
| 5,583,871 | 12/1996 | Simmonds et al. | 320/151 |
| 5,652,500 | 7/1997 | Kadouchi et al. | 320/150 |
| 5,659,239 | 8/1997 | Sabchez et al. | 320/150 |
| 5,668,461 | 9/1997 | Hancock et al. | 320/160 |
| 5,717,313 | 2/1998 | Grabon | 320/150 |
| 5,739,673 | 4/1998 | Le Van Suu | 320/150 |
| 5,767,659 | 6/1998 | Farley | 320/150 |
| 5,825,159 | 10/1998 | Patino | 320/150 |
| 5,886,527 | 3/1999 | Ito | 320/150 |
| 5,912,547 | 6/1999 | Grabon | 320/150 |

FOREIGN PATENT DOCUMENTS

| | | | |
|---|---|---|---|
| 0 621 990 | 6/1996 | European Pat. Off. | H02J 7/04 |
| 5-244729 | 9/1993 | Japan | H02F 7/10 |
| 7-502860 | 3/1995 | Japan | H01M 10/44 |
| 2599333 | 1/1997 | Japan | H02J 7/10 |
| 10-14125 | 1/1998 | Japan | H02J 7/10 |

*Primary Examiner*—Adolf Deneke Berhane
*Assistant Examiner*—Pia Tibbits
*Attorney, Agent, or Firm*—Sughrue, Mion, Zinn, Macpeak & Seas, PLLC

[57] ABSTRACT

A battery charger and a charging method capable of charging a battery for a short period of time while suppressing battery temperature from rising. The current temperature of the battery is detected (in step S12) and a temperature rise is calculated from the detected temperature (in step S14). An allowable current map is then retrieved from the detected temperature and the obtained temperature rise, an allowable current with which the battery can be charged while suppressing battery temperature from rising is obtained (in step S16) and the battery is charged with the allowable current (in step S20). Since the allowable current which the battery can be charged with, while suppressing battery temperature from rising is retrieved using the map which the allowable current is mapped, based on battery temperature and battery temperature rise, and charging current is controlled, it is possible to charge the battery for a short period of time while suppressing battery temperature from rising.

2 Claims, 6 Drawing Sheets

|  | \|T\| | | | | |
|---|---|---|---|---|---|
|  | ~T₁ | T₁~T₂ | T₂~T₃ | T₃~T₄ | T₄~ |
| dT/dt ~X₁ | I₁₁ | I₁₂ ⟨1⟩⟨3⟩ | I₁₃ ⟨4⟩ | I₁₄ ⟨9⟩ | I₁₅ ⟨10⟩⟨12⟩ |
| X₁~X₂ | I₂₁ | I₂₂ ⟨2⟩ | I₂₃ ⟨5⟩⟨7⟩ | I₂₄ ⟨8⟩ | I₂₅ ⟨11⟩⟨13⟩ |
| X₂~ | I₃₁ | I₃₂ | I₃₃ ⟨6⟩ | I₃₄ | I₃₅ ⟨14⟩⟨15⟩ |

Fig. 7

BATTERY CHARGER AND CHARGING METHOD

BACKGROUND OF THE INVENTION

1. Field of the Invention

The present invention relates to a battery charger and a charging method for charging a battery. The present invention relates, in particular, to a battery charger and a charging method suitable for charging a battery, such as a nickel metal hydride battery, which accumulates a large amount of heat during charging.

2. Description of the Related Art

A charging-type battery which can be repeatedly charged is recently used as a power source for a power tool, for example. A nickel metal hydride battery is widely used as the power tool battery of this type. To charge the battery, a battery charger for rapidly charging the battery with high current is used. That is, while a battery is rapidly charged for about 20 minutes and, a power tool can be continuously used while replacing a currently used battery with another one which has been charged.

The inventor of the present invention studied ways to improve the performance of a power tool by using, as a battery, a nickel metal hydride battery. Although the nickel metal hydride battery can provide higher capacity than a nickel-cadmium battery, a large amount of heat is generated during charging. If the battery temperature becomes high due to the generated heat, the electrodes and separators of cells within the battery deteriorate and battery life is shortened. Due to this, the nickel metal hydride battery cannot be rapidly charged with high current unlike the nickel-cadmium battery.

Furthermore, the nickel metal hydride battery is more sensitive to overcharge than the nickel-cadmium battery and overcharging makes the battery life shorter. For that reason, it is required to avoid overcharging the nickel metal hydride battery. As for equipment which does not require battery replacement, to avoid overcharging the battery, charging current and discharging current are integrated and a battery is charged based on the integrated value. Thus, the battery can be fully charged. In case of charging a battery for equipment such as the above-stated power tool which requires replacing one battery with another, however, it has been difficult to fully charge the battery without overcharging it.

SUMMARY OF THE INVENTION

The invention recited in claims 1 and 3 has been made to solve the above-stated disadvantages and has an object to provide a battery charger and a charging method capable of charging a battery for a short period of time while suppressing battery temperature from rising.

The invention recited in claims 2 and 4 has been made to solve the above-stated disadvantages and has an object to provide a battery charger and a charging method capable of fully charging a battery without fear of an overcharge.

To attain the above object, the battery charger recited in claim 1 is technically characterized by comprising:

a memory for storing a map for mapping an allowable value of current, with which a battery can be charged while suppressing battery temperature from rising, based on a battery temperature and a battery temperature rise;

a temperature detection device for detecting a current temperature of the battery;

a temperature rise output device for obtaining the temperature rise from the temperature detected by the temperature detection device;

an allowable current retrieval device for retrieving the map of the memory device from the temperature detected by the temperature detection device and the temperature rise outputted from the temperature rise output device, and for obtaining the allowable value; and a charging device for charging the battery with the allowable current retrieved by the allowable current retrieval device.

To attain the above object, the battery charger recited in claim 2 is technically characterized by comprising:

a memory for storing a map for mapping an allowable value of current, with which a battery can be charged while suppressing battery temperature from rising, based on a battery temperature and a battery temperature rise, the map having the allowable current value set low when the battery temperature is high and set low when the temperature rise is large;

a temperature detection device for detecting a current temperature of the battery;

a temperature rise output device for obtaining the temperature rise from the temperature detected by the temperature detection device;

an allowable current retrieval device for retrieving the map of the memory device from the temperature detected by the temperature detection device and the temperature rise outputted from the temperature rise output device, and for obtaining the allowable value;

a charging device for charging the battery with the allowable current retrieved by the allowable current retrieval device;

a charging completion determination device for determining that charging is completed based on whether or not the temperature detected by the temperature detection device and the temperature rise outputted from the temperature rise output device belong to a region indicating a final charging stage (a region in which temperature rise is relatively large and relatively low allowable current is outputted) on the map of the memory device with high frequency; and a charging completion device for completing charging based on the determination of the charging completion determination device that charging is completed.

To attain the above object, the charging method recited in claim 3 is technically characterized by comprising:

detecting current temperature of a battery;

obtaining a temperature rise from the detected temperature;

retrieving an allowable current map based on battery temperature and battery temperature rise, from the detected temperature and the obtained temperature rise, and obtaining an allowable value of current, with which the battery can be charged while suppressing the battery temperature from rising; and charging the battery with the retrieved allowable current.

To attain the above object, the charging method recited in claim 4 is technically characterized by comprising:

detecting a current temperature of a battery;

obtaining a temperature rise from the detected temperature;

retrieving an allowable current map based on battery temperature and battery temperature rise, from the detected temperature and the obtained temperature rise, and obtaining an allowable value of current with which the battery can be charged while suppressing the battery temperature from rising;

charging the battery with the retrieved allowable current;

determining that charging is completed based on whether the outputted temperature rise is relatively large and whether relatively low allowable current is outputted from the map with a high frequency; and completing charging based on the determination that charging is completed.

According to the battery charger and charging method recited in claims 1 and 3, charging current is controlled using a map for mapping an allowable value of current with which a battery can be charged while suppressing battery temperature from rising based on battery temperature and battery temperature rise. That is, the map is retrieved from the battery temperature and temperature rise. The allowable value of current, with which the battery can be charged while suppressing the battery temperature from rising, is obtained. The battery is charged with the allowable current thus obtained. This makes it possible to charge a nickel metal hydride battery, the temperature of which tends to rise during charging, for a short period of time without causing deterioration due to temperature rise. Just before charging is completed, the temperature rise of the nickel metal hydride battery is larger and the battery is charged with relatively low current, therefore it is possible to suppress "overshoot" after the completion of charging.

According to the battery charger and charging method recited in claims 2 and 4, charging current is controlled using a map for mapping an allowable value of current with which a battery can be charged while suppressing battery temperature from rising based on battery temperature and battery temperature rise. That is, the map is retrieved from the battery temperature and temperature rise. The allowable value of current, with which the battery can be charged while suppressing the battery temperature from rising, is obtained. Consequently, the battery is charged with the allowable current thus obtained. This makes it possible to charge a nickel metal hydride battery the temperature of which tends to rise during charging, for a short period of time without causing deterioration due to temperature rise. Just before charging is completed, the temperature rise of the nickel metal hydride battery is larger and the battery is charged with relatively low current, therefore it is possible to suppress "overshoot" after the completion of charging.

The completion of charging is determined, in particular, based on whether or not a temperature rise is relatively large and whether or not relatively low current is outputted from the map with high frequency. That is, based on whether or not temperature rise is large and whether or not the rise is large even if charging current is decreased. Due to this, it is possible to fully charge the battery without fear of overcharging and without being influenced by the remaining battery capacity, temperature and the like.

DESCRIPTION OF THE PREFERRED EMBODIMENT

A battery charger and a charging method in one embodiment according to the present invention will be described with reference to the accompanying drawings.

The embodiment which explicitly depicts the present invention will be described hereinafter with reference to the accompanying drawings.

Figure 1:
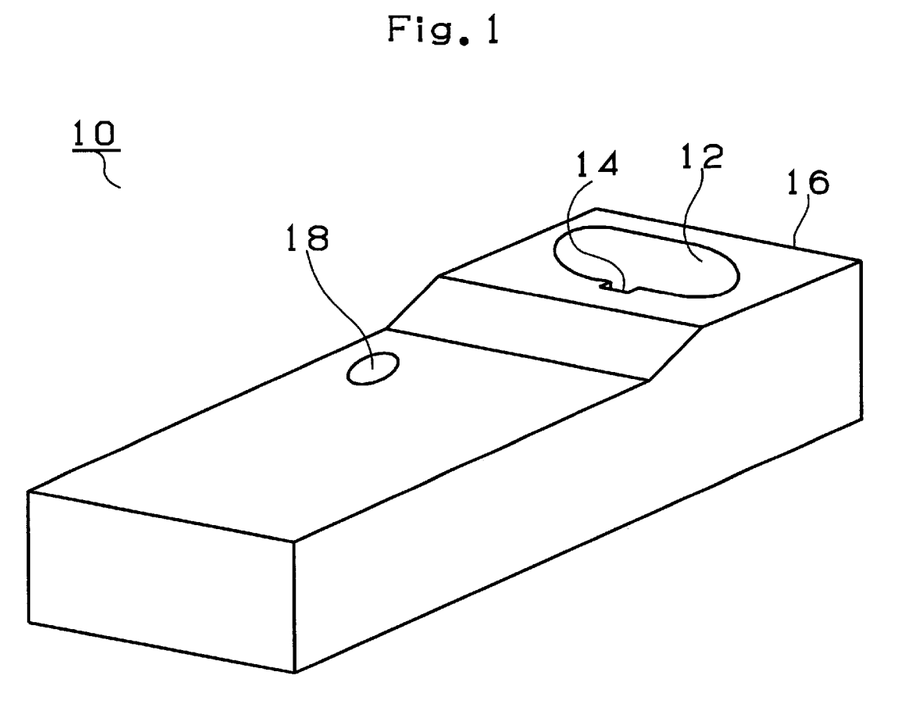
FIG. 1 is a perspective view of a battery charger in an embodiment according to the present invention.
Figure 2:
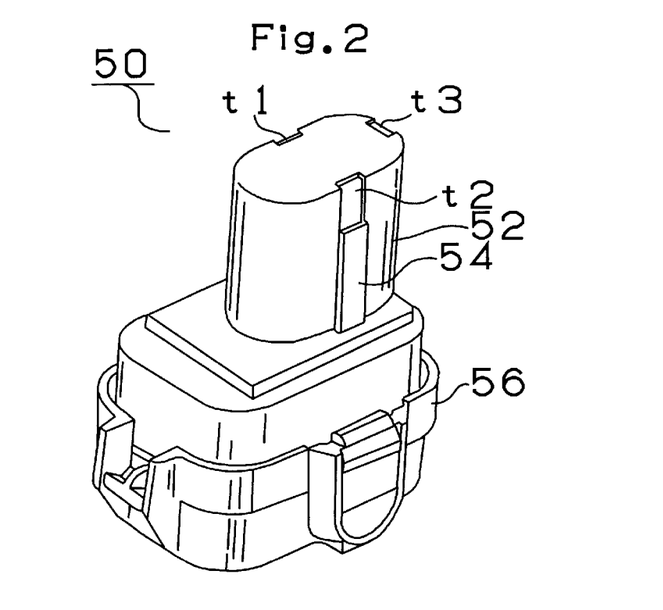
FIG. 2 is a perspective view of a battery pack in the embodiment according to the present invention.
Figure 3:
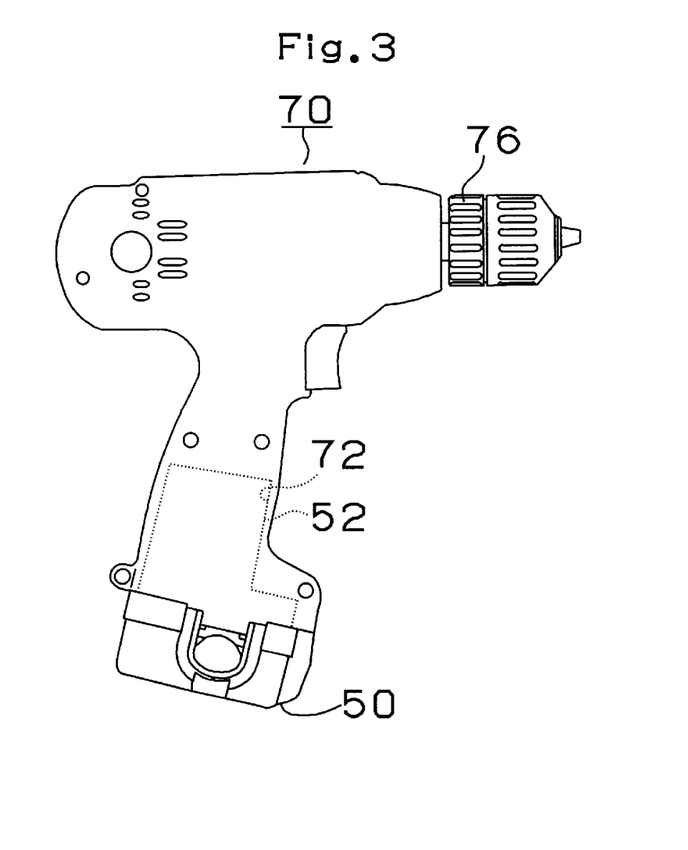
FIG. 3 is a perspective view of a battery drill using the battery pack shown in FIG. 2.

FIG. 1 shows a battery charger 10 in one embodiment according to the present invention. FIG. 2 shows a battery pack 50 charged by the battery charger. FIG. 3 shows a battery drill 70 driven by the battery pack 50.

As shown in FIG. 2, the battery pack 50, including a nickel metal hydride battery, consists of a generally cylindrical fitted section 52 and a generally prismatic base 56. A key-shaped key section 54 is formed on the side surface of the fitted section 52. The first input terminal t1 connected to the cathode of the battery, the second input terminal t2 connected to the anode therein and the third terminal t3 connected to a temperature sensor consisting of a thermistor are provided on the upper portions of the fitted section 52.

As shown in FIG. 1, a fitting hole 12 for fitting the fitted section 52 of the battery pack 50 is formed at the battery charger 10 for charging the battery pack 50. A key way 14 for introducing the key section 54 of the fitted section 52 is formed on the sidewall of the fitting hole 12. The fitting hole 12 is integral with a housing 16 which constitutes the battery charger 10 and is made from resin. In this embodiment, the key section 54 is provided at the fitted section 52 of the battery pack 50 and the fitted hole 12 of the battery charger 10 is provided with the key way 14. This thereby prevents the battery pack 50 from being fitted in an incorrect manner. First to third output terminals (not shown) are provided at the bottom of the fitting hole 12 to make contact with the first to third terminals t1, t2 and t3 of the battery pack 50. An LED lamp 18 is provided on the top of the battery charger 10 to indicate that the battery is being charged.

As shown in FIG. 3, a fitting hole 72 for fitting the fitted section 52 of the battery pack 59 is provided in the battery drill 70. When electric power is supplied from the first and second input terminals t1 and t2 of the battery pack 50 to the battery drill 70, a motor (not shown) is driven to rotate a chuck 76. If the battery drill 70 is in use, a plurality of batteries which have been charged within the battery pack 50 are sequentially used to allow continuous operation. To this end, the battery charger 10 in this embodiment is designed to be capable of rapidly charging the battery pack 50 in approximately 20 minutes.

Figure 4:
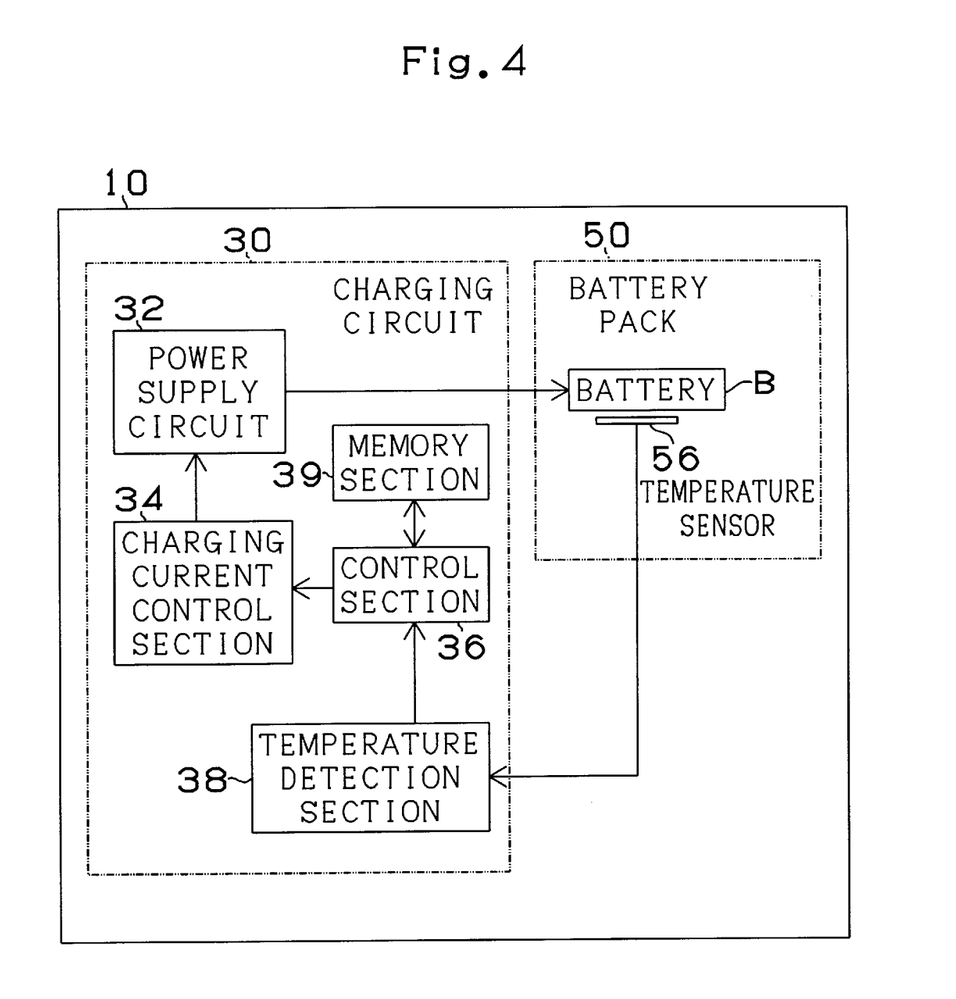
FIG. 4 is a block diagram showing a charging circuit in the battery charger shown in FIG. 1.

FIG. 4 shows the configuration of a control circuit within the battery charger 10. The control circuit 30 consists of a temperature detection section 38 for detecting the temperature of a battery from an output value of a temperature sensor (or thermistor) 56 provided at the battery pack 50 side, a memory section 39 for storing a current controlling map, a control section 34 for obtaining a temperature rise by differentiating a temperature value outputted from the temperature detection section 38, obtaining an allowable current value with which the battery can be charged while suppressing the rise of battery temperature from retrieving the map based on the temperature value and the temperature rise, and outputting the allowable current value as a current command value to the charging control section 34, and the charging current control section 34 for controlling a power supply circuit 32 based on the current command value derived from the control section 36 and from adjusting the battery charging current.

Figure 5:
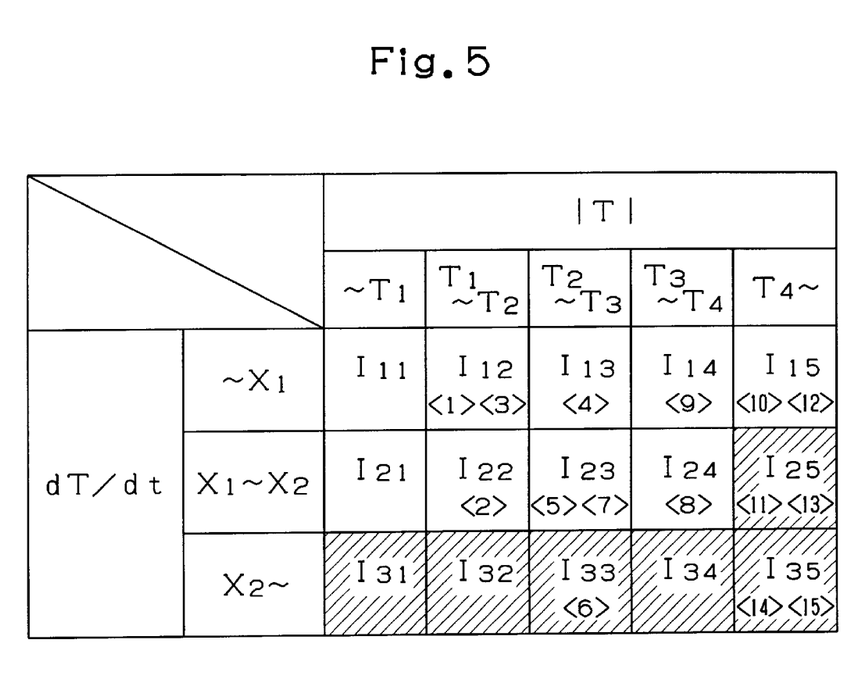
FIG. 5 is an explanatory view showing the content of a map held in the charging circuit.

Description of the constitution of the map used for current control will continuously be given with reference to FIG. 5.

If the battery is charged with high current, charging time is shortened but temperature rises accordingly. Conversely, if the battery is charged with lower current, charging time is lengthened but temperature rise is smaller. The nickel metal hydride battery, in particular, possesses characteristics that a temperature gradient (or temperature rise) greatly varies in accordance with charging current or the presently charged capacity. Considering the characteristics, in this embodiment, the battery is charged while changing current value to suppress the temperature rise. Specifically, in the battery charger according to the conventional technique, the battery is charged with current of a constant value. In the battery charger of this embodiment, by contrast, the state of the battery is determined based on the absolute temperature and temperature rise, the battery is charged with as high current as possible which can be applied while suppressing the battery temperature from rising, i.e., the battery is charged with varying current in accordance with the state of the battery.

In this embodiment, if the battery temperature is high, relatively low charging current is applied. If the temperature is low, relatively high charging current is applied. If temperature rise is large, relatively low charging current is applied. If the temperature rise is small, relatively high charging current is applied.

The map is provided for variable-control of current and for specifying an optimum value of current which can be applied when temperature rise is suppressed. In the map, the horizontal axis indicates the absolute temperature T of a battery and the vertical axis indicates a temperature difference dT/dt. That is, if the temperature of the battery is high and temperature rise is large (lower right side on the map), then a relatively low charging current is applied. If the temperature of the battery is high and the temperature rise is small (upper end side on the map), a medium level charging current is applied. If the battery temperature is low and the temperature rise is large (lower left side on the map), a medium level charging current is applied. If the battery temperature is low and the temperature rise is low (upper left on the map), a relatively high charging current is applied. Namely, such optimum current values are set on the map in order to meet both expected charging time (approximately 20 minutes) and expected final temperature.

If high current is discharged at low temperature (0° C. or less), battery performance deteriorates. It is, therefore, desirable to set a low current value on the left column on the map in order to avoid performance deterioration.

Based on the map, a region is retrieved to meet the absolute temperature T and a temperature difference dT/dt from the battery and charging current, it is controlled on the basis of the current specified in the region. If, for example, the battery temperature is between T3 and T4 and the battery temperature difference (charging temperature) is between X1 and X2, then current in the region 124 is outputted.

Thereafter, the battery charger in this embodiment detects that charging is completed based on the movement of current within the regions on the map. That is, according to the conventional technique, completion of charging is detected by keeping charging current constant and observing temperature or voltage. More specifically, the conventional device detects a temperature rise and a voltage variation as well as that the battery is fully charged and voltage decreases. It also determines that the battery is fully charged. In the battery charger in this embodiment, since charging current is changed as stated above, it is impossible to detect that the battery charging is completed from only monitoring temperature and a temperature variation, or voltage and a voltage variation. In this embodiment, therefore, the battery charger detects charging is completed based on the movement of current in ranges on the map.

While the battery is being charged, a current value apparently moves within the regions at random based on the temperature and temperature rise. In other words, before the battery is fully charged, the battery temperature rises or a temperature rise is large. If a relatively small charging current region is selected, that is, after a region on the lower right side on the map is selected, then current decreases and temperature rise is smaller. The current region thus corresponds to an upper side region on the map.

Nonetheless, as the battery is close to a fully charged state, a temperature rise becomes larger due to the characteristics of the nickel metal hydride battery. That is, as temperature rise is larger, a lower region is selected on the map. In that case, even if the battery is charged with relatively low current, temperature rise remains large. Using this principle, the battery charger in this embodiment conducts measurements repeatedly (for example three times) at predetermined intervals (e.g., at several thousand seconds' intervals). In a case where current belong to hatched regions I31, I32, I33, I34 and I35 in which temperature rise is large, and to region I25 in which temperature is high and temperature rise is at medium level, it is determined that the battery charging is completed and the charging is then stopped.

Charging operation of the charging circuit 30 will be described in more detail with reference to a graph shown in FIG. 6.

Figure 6:
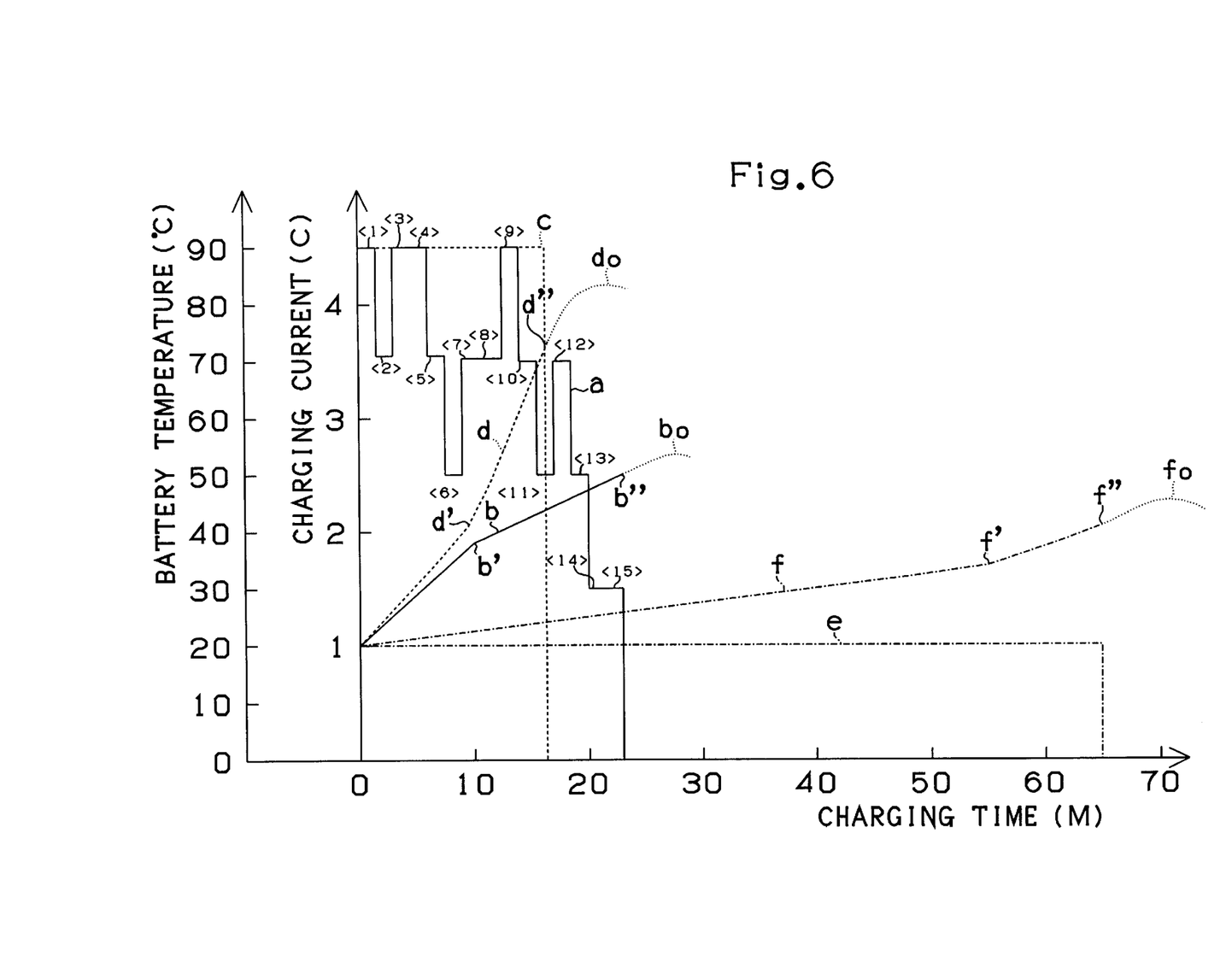
FIG. 6 is a graph showing the change of charging current and that of battery temperature both controlled by the charging circuit.

In FIG. 6, the horizontal axis indicates charging time, whereas the vertical axis indicates charging current and battery temperature. FIG. 6 also shows, as comparison, temperature rise in a case where a nickel metal hydride battery has been charged for one hour and temperature rise in a case where the battery is rapidly charged as well as the case of the battery charger in this embodiment.

Conventionally, to avoid generating heat while a nickel metal hydride is being charged, 1 C charging is conducted as shown in dash line e of FIG. 6. That is, a 2AH nickel metal hydride battery is charged with 2A charging current for about one hour (65 minutes in FIG. 6). In case of 1C charging, charging starts at a temperature of 20° C. as shown in dotted line f of FIG. 6 and ends at a temperature of 40° C. Due to the characteristics of the nickel metal hydride battery, a temperature rise is seen just before the completion of charging (55 minutes after the start of charging) shown in f' of FIG. 6 and further temperature rise is seen from a time f" at which charging is completed (overshoot f0). It is considered that the overshoot of the nickel metal hydride battery depends on the gradient of temperature rise at the time charging is completed. If a gradient at f'–f" is small, overshoot-induced temperature rise is small. If the gradient is large, that is, temperature greatly increases at the end of charging, then overshoot-induced temperature rise is large.

Meanwhile, chain line c indicates current if a battery is rapidly charged (4.5C charging) with constant high current (9A) by a conventional battery charger so as to complete charging in approximately 20 minutes. Chain line d indicates the temperature change of the nickel metal hydride in rapid charging. As indicated by the chain line d, even if charging starts at a temperature of 20° C., the temperature reaches 70° C. at which the nickel metal hydride battery life is shortened when charging is completed. Moreover, temperature rapidly rises just before the completion of charging (11 minutes after start) indicated by d' in FIG. 6 until d" at which charging is completed. Due to this, temperature greatly rises at time d" at which charging is completed (overshoot d0). The overshoot d0 causes temperature to rise further as high as 80° C. even after charging is completed, as a result the life of the nickel metal hydride battery is shortened. According to the graph of FIG. 6, since charging starts at 20° C. and is completed at 80° C., a temperature rise is 60° C. during that period. If, therefore, charging of the nickel metal hydride battery starts at 30° C., and temperature rises by 60° C. to 90° C. or higher, the battery performance greatly deteriorates at this point.

Full line <a> indicates a change in charging current in the battery charger in the first embodiment according to the present invention, whereas full line <b> indicates a change in the temperature of nickel metal hydride battery if the battery is charged by the battery charger in this embodiment. The battery charger 10 in this embodiment applies relatively low charging current if battery temperature is high and temperature rise is large. The device 10 applies medium level charging current if battery temperature is high and temperature rise is small. The device 10 applies medium level charging current if battery temperature is low and temperature rise is large. The device 10 applies relatively high charging current if battery temperature is low and temperature rise is small. In this way, the battery charger 10 in this embodiment adjusts current based on the temperature of the nickel metal hydride battery and its temperature rise. The device 10 starts charging the battery at a temperature of 20° C. as shown in the full line <b> while controlling the temperature to fall within 50° C. or less so as not to affect the battery life. In other words, the device 10 adjusts charging current to maximum current while avoiding exceeding the expected temperature and shortening charging time.

As stated above, the battery charger 10 constantly changes charging current in accordance with the battery temperature and temperature rise. That is, high current is applied at an initial charging stage, i.e., while battery temperature is low and temperature rise is small. Relatively low charging current is applied at a final charging stage, i.e., if battery temperature is high and temperature rise is large so that temperature rise is kept small just before the completion of charging. Specifically, temperature rise is small (or temperature rise gradient is small) from a time b' (11 minutes after the start of charging) just before the completion of charging until a time b" at which charging is completed. As a result, temperature rise (overshoot b0) after the completion of charging is small and heat generation during and after charging is suppressed such that temperature rise during and after charging is almost as same (approximately 50° C.) as that in 1C charging indicated by the dotted line f.

Even in 1C charging as indicated by the dotted line f, if battery temperature at the start of charging is high, for example, if charging is started at a battery temperature of 30° C., then temperature rises by 30° C. and reaches 60° C. at the completion of charging. In this embodiment, by contrast, current is controlled in accordance with temperature and battery temperature can be limited to up to 50° C. when charging is completed. In the case of the power tool battery, in particular, where the motor is continuously driven with high current and capacity is exhausted, it is probable that charging starts when battery temperature is high enough. In the battery charger in this embodiment, even if a nickel metal hydride battery is at such a high temperature it can charge to the extent that the temperature does not exceed an expected charging temperature. It is, thus, possible to repeatedly use the nickel metal hydride battery for a long period of time.

Figure 7:
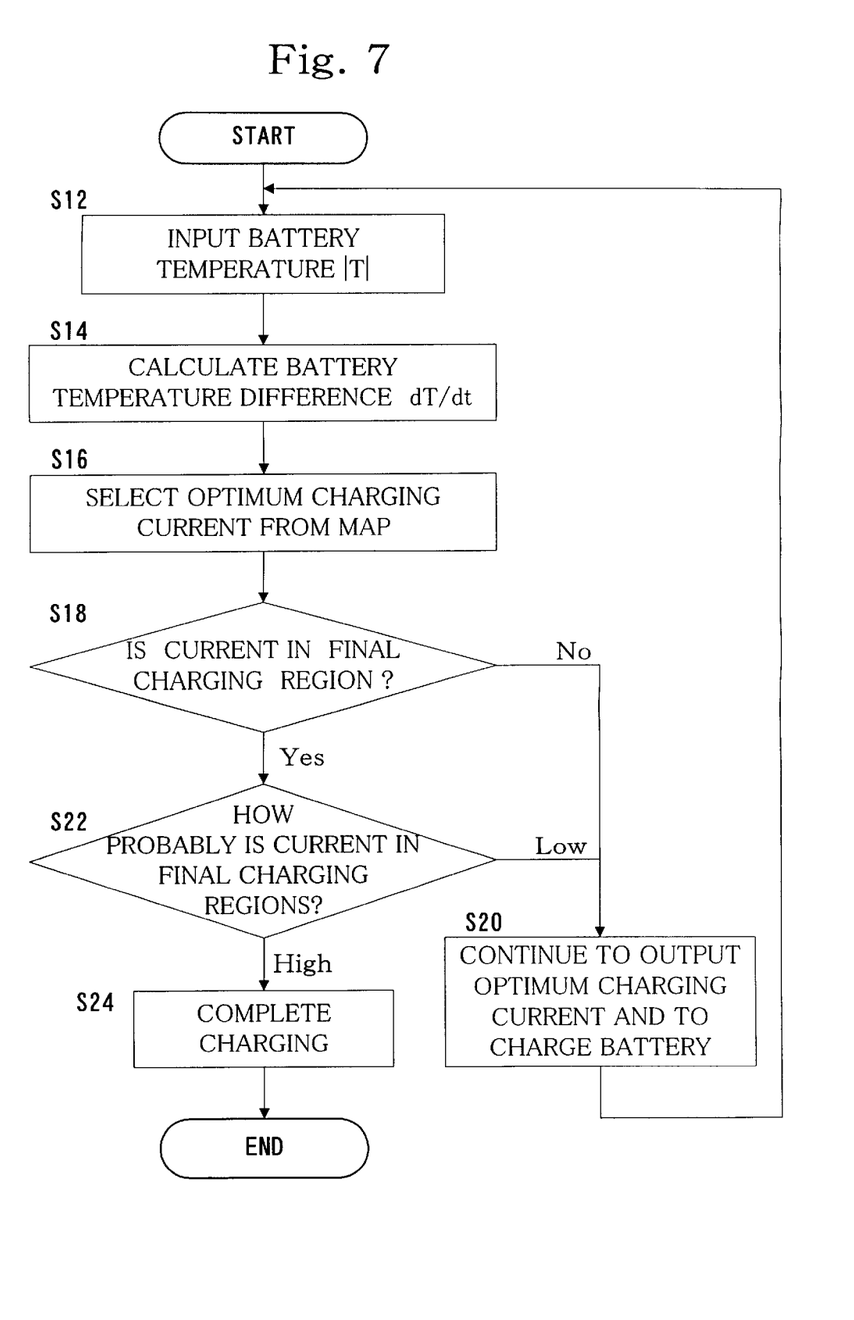
FIG. 7 is a flow chart showing the charging circuit process.

Specific processing of the battery charger in this embodiment will be described with reference to FIGS. 5 and 6 as well as the flow chart shown in FIG. 7.

First, after charging starts, a control section 36 of the battery charger (see FIG. 4) adjusts charging current and determines whether battery charging is completed in a predetermined cycle (here, at 100 seconds' intervals for the convenience of description, but actually far shorter intervals of 10 seconds or less). Specifically, first, the absolute temperature T of the nickel metal hydride battery is inputted (in step S12). Next, the inputted absolute temperature T is differentiated and a battery temperature difference dT/dt is calculated (in step S14). Based on the absolute temperature T and the temperature difference dT/dt, an optimum charging current is selected from the map which has been already described with reference to FIG. 5 (in step S16). In this case, as indicated in cycle <1>, where the absolute temperature T is between T1 and T2 and the temperature difference dT/dt is X1 or less, region I12 is selected and relatively high current of 4.5C charging current (9A) is applied as indicated by the full line a shown in FIG. 7.

Thereafter, the control section 36 determines whether current is in final charging regions, i.e., hatched regions I31, I32, I33, I34 and I35 in which temperature rise is large and in a region I25 in which temperature rise is medium level (in step S18). In this case, since the current is not in the final charging region ("NO" in the Step S18), process returns to the step S12 and control of the charging current continues. In cycle <2> after more than 100 seconds pass, because a relatively high current has been applied in cycle <1> as stated above, the temperature difference dT/dt is larger (X1 to X2) and region I22 is selected, so that medium level current (3.5C) is selected. Since the medium level current is selected in the cycle <2>, the temperature difference dT/dt turns into X1 or less. In cycle <3>, the region I12 is selected and relatively high charging current is thereby selected once again.

As stated above, if charging is continued while current value is changed in accordance with the absolute temperature T and the temperature difference dT/dt, the difference dT/dt gradually increases. In cycle <6>, as shown in FIG. 5, the temperature difference dT/dt exceeds X2 and enters region I33. In this case, the determination result is Yes in step 18. That is, current is determined in the final charging regions (regions I31, I32, I33, I34, I35 and I25) as stated above, and it is then determined whether current is highly probable in the final charging regions (in step S22). It is determined that it is highly probable in the final charging regions if it enters the final charging regions in three consecutive cycles. While the current is decreased in the cycle <6>, the absolute temperature T is between T2 and T3 and the temperature difference dT/dt is decreased to X1 to X2 in the next cycle <7>, whereby current is in the region I23. Thus, the determination result as to whether it is highly probable that current is in the final charging region is Low in step S22 and the process goes on to step 20 in which charging continues with a variable charging current.

Meanwhile, if current enters region I25 which belongs to final charging regions in cycle <13>, current enters the region I35 which also belongs to the final charging regions in the next cycles <14> and <15>. If current enters final charging regions in three consecutive cycles, the determination result as to whether it is high probable that current enters a final charging region is High and charging is completed (in step S24), thereby ending all series of processing.

In the above-stated example, description has been given to a case where cycle time is 100 seconds for convenience of description. Due to this, it is determined that it is highly probable if current enters final charging regions in three consecutive cycles. If cycle time is made shorter than a 100 seconds' cycle, it is possible to determine that it is high probable that current enters final charging regions using various methods. For instance, in a 10 seconds' cycle, it is highly probable that current enters the final charging regions in eight out of 10 cycles. Alternatively, it can be determined that probability is high if current enters the final charging regions in eight out of 10 cycles and if current enters the final charging regions in five consecutive cycles.

As described above, the conventional battery charger for charging a nickel-cadmium battery detects that charging is completed by keeping a current value constant and monitoring one or more of temperature, temperature change, voltage and voltage change. In the case of a nickel metal hydride battery, however, patterns of temperature and voltage change vary in accordance with the battery remaining capacity, battery temperature at the start of battery charging and outside temperature. Due to this, it has been difficult to fully charge the nickel metal hydride battery without fear of overcharge. The battery charger in this embodiment, by contrast, continuously monitors the absolute temperature T and temperature difference dT/dt while narrowing down charging current. It is, therefore, possible to fully charge the battery without fear of overcharge.

The embodiment has been described so far, taking processing for charging a nickel metal hydride battery for an example. The battery charger and charging method according to the present invention can be also applied to processing for charging a nickel-cadmium battery. As specified, if the map shown in FIG. 5 is adjusted to the characteristics of the nickel-cadmium battery, the present invention is applicable to the process for charging a nickel-cadmium battery. In addition, if the map is adjusted to the common characteristics (greatest common divisor) of a nickel-cadmium battery and a nickel metal hydride battery, both the nickel-cadmium battery and the nickel metal hydride battery can be charged. Furthermore, the battery pack 50 may be provided with a discriminating terminal (such as a boss) for discriminating a nickel metal hydride battery from a nickel-cadmium battery and a map may be prepared for each of the nickel metal hydride battery and the nickel-cadmium battery at the battery charger side. If the battery pack 50 of the nickel metal hydride battery is installed, charging can be controlled according to the map for the nickel metal hydride battery. If the battery pack 50 of the nickel-cadmium is installed, charging can be controlled according to the map for the nickel-cadmium battery.

As stated so far, according to the present invention, the map is retrieved and the battery is charged with allowable current with which the battery can be charged while suppressing battery temperature from rising. This makes it possible to charge a nickel metal hydride battery, the temperature of which tends to rise during charging, for a short period of time without causing a deterioration in the battery due to temperature rise. In addition, just before the completion of charging, the temperature rise of the nickel metal hydride battery is larger and the battery is charged with a relatively low current, so that it is possible to suppress "overshoot" after the completion of charging.

According to the present invention, the map is retrieved and the battery is charged with allowable current with which the battery can be charged while suppressing battery temperature from rising. This makes it possible to charge a nickel metal hydride battery, the temperature of which tends to rise during charging, for a short period of time without causing deterioration in the battery due to temperature rise. In addition, just before the completion of charging, the temperature rise of the nickel metal hydride battery is larger and the battery is charged with relatively low current, so that it is possible to suppress "overshoot" after the completion of charging.

The completion of charging is determined, in particular, based on whether or not temperature rise is large and whether or not temperature rise is large even if the charging current is lowered. Due to this, it is possible to fully charge the battery without fear of overcharge and without being influenced by the remaining battery capacity, temperature and the like.

What is claimed is:

1. A battery charger comprising:

a memory for storing a map for mapping an allowable value of current, with which a battery can be charged while suppressing battery temperature from rising, based on a battery temperature and a battery temperature rise, said map having the allowable current value set low when the battery temperature is high and set low when the temperature rise is large;

a temperature detection device for detecting a current temperature of the battery;

a temperature rise output device for obtaining the temperature rise from the temperature detected by said temperature detection device;

an allowable current retrieval device for retrieving the map of said memory device from the temperature detected by said temperature detection device and the temperature rise outputted from said temperature rise output device, and for obtaining said allowable value;

a charging device for charging the battery with the allowable current retrieved by said allowable current retrieval device;

a charging completion determination device for determining that charging is completed based on whether the temperature detected by said temperature detection device and the temperature rise outputted from said temperature rise output device belong to a region indicating a final charging stage on the map of said memory device with a high frequency; and a charging completion device for completing charging based on the determination of said charging completion determination device when charging is completed.

2. A charging method comprising steps of:

detecting a current temperature of a battery;

obtaining a temperature rise from said detected temperature;

retrieving an allowable current map based on battery temperature and battery temperature rise, from said detected temperature and said obtained temperature rise, and obtaining an allowable value of current with which the battery can be charged while suppressing the battery temperature from rising;

charging the battery with said retrieved allowable current;

determining that charging is completed based on whether the outputted temperature rise is relatively large and whether relatively low allowable current is outputted from said map with a high frequency; and completing charging based on the determination that charging is completed.

* * * * *